(12) United States Patent
Han et al.

(10) Patent No.: US 9,690,985 B2
(45) Date of Patent: Jun. 27, 2017

(54) APPARATUS AND METHOD FOR RECOGNIZING OBJECT USING DEPTH IMAGE

(71) Applicant: Samsung Electronics Co., Ltd., Suwon-si (KR)

(72) Inventors: Jae Joon Han, Seoul (KR); Chang Kyu Choi, Seongnam-si (KR); Chang Kyo Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 668 days.

(21) Appl. No.: 14/074,247

(22) Filed: Nov. 7, 2013

(65) Prior Publication Data

US 2014/0233848 A1 Aug. 21, 2014

(30) Foreign Application Priority Data

Feb. 20, 2013 (KR) ........................ 10-2013-0017757

(51) Int. Cl.
*G06K 9/00* (2006.01)
*G06K 9/46* (2006.01)
*G06K 9/62* (2006.01)
*H04N 5/228* (2006.01)

(52) U.S. Cl.
CPC ..... *G06K 9/00375* (2013.01); *G06K 9/00201* (2013.01); *G06K 9/4652* (2013.01); *G06K 9/6282* (2013.01); *G06K 9/6298* (2013.01)

(58) Field of Classification Search
USPC ............... 382/100, 103, 106–107, 154, 155, 382/162–168, 173, 181, 190, 199, 209, 382/232, 254, 274, 276, 284–291, 305, 382/312, 180; 348/222.1, 708
See application file for complete search history.

(56) References Cited

U.S. PATENT DOCUMENTS

| | | | |
|---|---|---|---|
| 2008/0212836 A1* | 9/2008 | Fujimura | G06K 9/00369 382/103 |
| 2009/0244309 A1* | 10/2009 | Maison | G06K 9/00369 348/222.1 |
| 2011/0211754 A1* | 9/2011 | Litvak | G06K 9/00375 382/165 |
| 2011/0249190 A1* | 10/2011 | Nguyen | H04N 5/272 348/708 |
| 2012/0114225 A1* | 5/2012 | Lim | G06K 9/48 382/154 |

FOREIGN PATENT DOCUMENTS

KR 10-2012-0074925 7/2012

* cited by examiner

*Primary Examiner* — Seyed Azarian
(74) *Attorney, Agent, or Firm* — NSIP Law (57) ABSTRACT

An apparatus recognizes an object using a hole in a depth image. An apparatus may include a foreground extractor to extract a foreground from the depth image, a hole determiner to determine whether a hole is present in the depth image, based on the foreground and a color image, a feature vector generator to generate a feature vector, by generating a plurality of features corresponding to the object based on the foreground and the hole, and an object recognizer to recognize the object, based on the generated feature vector and at least one reference feature vector.

21 Claims, 10 Drawing Sheets

APPARATUS AND METHOD FOR RECOGNIZING OBJECT USING DEPTH IMAGE

CROSS-REFERENCE TO RELATED APPLICATIONS

This application claims the priority benefit of Korean Patent Application No. 10-2013-0017757, filed on Feb. 20, 2013, in the Korean Intellectual Property Office, the disclosure of which is incorporated herein by reference.

BACKGROUND

1. Field

Example embodiments relate to an apparatus and method for recognizing an object using a depth image, and more particularly, to technology for reducing an error occurring due to missing data included in the depth image.

2. Description of the Related Art

Recently, interest in technology for estimating a motion of a target object, for example, a human body, in a real space and implementing the estimated motion in a three-dimensional (3D) space, in fields of video games, virtual worlds, computer graphics (CG) in movies, and the like, is increasing.

A depth image refers to an image including a depth of a target object from a depth image camera.

SUMMARY

In an aspect of one or more embodiments, there is provided an apparatus for recognizing an object, the apparatus including a foreground extractor to extract a foreground from a depth image including a depth associated with the object, a hole determiner to determine whether a hole is present in the depth image, based on the foreground and a color image including a color associated with the object, a feature vector generator to generate a feature vector, by generating a plurality of features corresponding to the object using at least one of the foreground and the hole, based on a result of the determining, and an object recognizer to recognize the object, based on the generated feature vector and at least one reference feature vector corresponding to a predetermined shape of the object.

The hole determiner may include a hole extractor to extract a hole based on the foreground and the color image when it is determined that the hole is present in the depth image.

The hole extractor may calculate a probability that pixels included in the color image are included in the object, based on color information of the pixels, and extract the hole based on the probability.

The plurality of features may include information regarding whether a feature corresponds to a hole. Here, when it is determined that a hole is present in the depth image, the feature vector generator may determine a value of a feature corresponding to the hole, based on statistical values associated with features corresponding to the foreground.

The object recognizer may compare, based on the information regarding whether a feature corresponds to a hole, remaining features, excluding a feature corresponding to a hole from a plurality of features included in the feature vector, to reference features included in the at least one reference feature vector.

The object recognizer may include a decision tree obtainer to obtain a decision tree for comparing the feature vector to the at least one reference feature vector, and an object estimator to recognize a branch node corresponding to a feature corresponding to a hole, among the plurality of features, based on the information regarding whether a feature corresponds to a hole, traverse a plurality of branches based on the branch node, and estimate the object based on information included in a plurality of leaf nodes to be reached based on a result of the traversing. Here, the decision tree may include a plurality of branch nodes corresponding to a plurality of features included in the feature vector, and at least one leaf node including information related to a shape of the object.

The at least one reference feature vector may include a plurality of codewords generated by a hierarchical clustering scheme. The object recognizer may detect a codeword most similar to the feature vector, among the plurality of codewords, by comparing the plurality of codewords to the feature vector, and recognize the object using the detected codeword.

In addition, the at least one reference feature vector may include a plurality of codewords. The plurality of codewords may be stored in a database provided in advance. The object recognizer may detect a codeword most similar to the feature vector, among the plurality of codewords, by comparing the feature vector to the plurality of codewords using the database, and recognize the object using the detected codeword.

In an aspect of one or more embodiments, there is provided an apparatus for recognizing an object, the apparatus including an extractor to extract a foreground and a background from a depth image including a depth associated with the object, a determiner to determine a depth value of the background, based on statistical values associated with depth values of pixels corresponding to the foreground, a feature vector generator to generate a feature vector, by generating a plurality of features corresponding to the object based on the depth value of the background and the depth values of the pixels corresponding to the foreground, and an object recognizer to recognize the object, based on the feature vector and at least one reference feature vector corresponding to a predetermined shape of the object.

In an aspect of one or more embodiments, there is provided a method of recognizing an object, the method including acquiring a depth image including a depth associated with the object, and a color image including a color associated with the object, extracting a foreground from the depth image, determining whether a hole is present in the depth image, using the foreground and the color image, and generating a feature vector for recognizing the object, by generating a plurality of features corresponding to the object using at least one of the foreground and the hole, based on a result of the determining.

In an aspect of one or more embodiments, there is provided a method of recognizing an object, the method including acquiring a depth image including a depth associated with the object, extracting a foreground and a background from the depth image, calculating statistical values associated with depth values of pixels corresponding to the foreground, determining a depth value of the background based on the statistical values, and generating a feature vector for recognizing the object, by generating a plurality of features corresponding to the object based on the depth value of the background and the depth values of the pixels corresponding to the foreground.

In an aspect of one or more embodiments, there is provided a method of recognizing an object, the method including acquiring a depth image comprising a depth associated with the object, and a color image comprising a color associated with the object; extracting a foreground and background from the depth image; calculating statistical values including at least one of a minimum value, a maximum value, an intermediate value, an average and a standard deviation of depth values of pixels corresponding to the foreground; determining depth value of background based on calculated statistical values; and generating, using at least one processor, a feature vector for recognizing the object, by generating a plurality of features corresponding to the object based on the determined depth value of the background and the depth values of the pixels corresponding to the foreground.

According to another aspect of one or more embodiments, there is provided at least one non-transitory computer readable medium storing computer readable instructions to implement methods of one or more embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
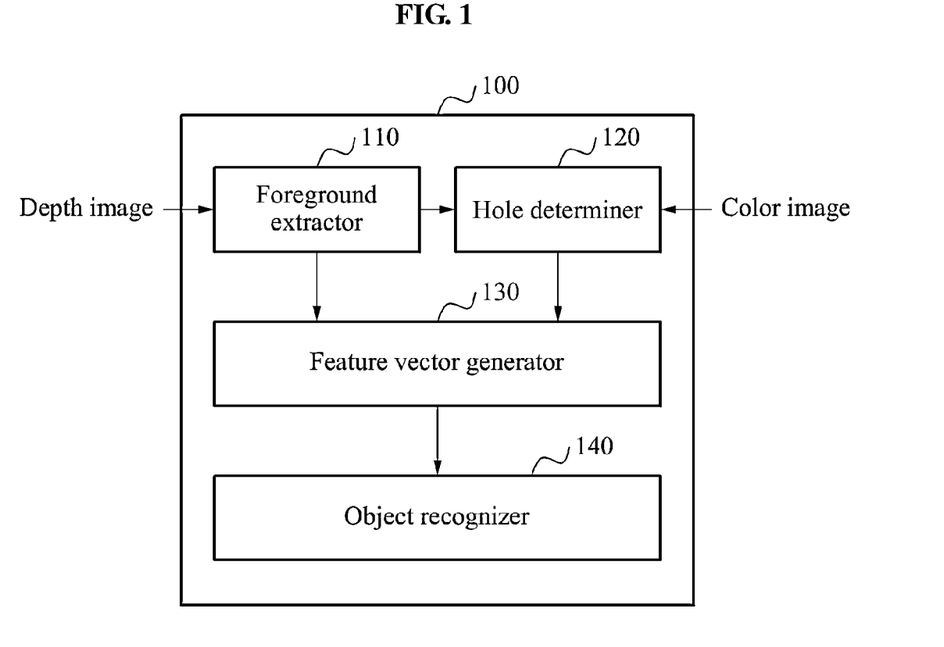
FIG. 1 illustrates an apparatus for recognizing an object using a depth image and a color image according to example embodiments.

FIG. 1 illustrates an apparatus 100 for recognizing an object using a depth image and a color image according to example embodiments.

Referring to FIG. 1, the apparatus 100 may include a foreground extractor 110, a hole determiner 120, a feature vector generator 130, and an object recognizer 140.

The foreground extractor 110 may extract a foreground from a depth image including a depth associated with the object. Here, the object may refer to an input having at least one predetermined shape, and may include, for example, a hand of a user capable of taking a plurality of postures, and the like.

For example, the foreground extractor 110 may extract the foreground included in the depth image, based on a predetermined threshold depth. In this instance, the predetermined threshold depth may be a criterion for distinguishing between a foreground and a background in a depth image.

The foreground extractor 110 may classify, in the depth image, an area of which a depth is less than or equal to the predetermined threshold depth as the foreground, and an area of which a depth is greater than the predetermined threshold depth as the background. In this instance, the foreground extracted by the foreground extractor 110 may be a preliminary candidate for the object.

In addition, the hole determiner 120 may determine whether a hole is present in the depth image, based on the foreground extracted by the foreground extractor 110 and a color image including a color associated with the object.

Here, the depth image and the color image of the object may be captured simultaneously. The hole in the depth image may include an area not classified as the object due to various factors, among areas to be classified as the object.

For example, the hole in the depth image may occur due to a low resolution of the depth image. The hole in the depth image may occur due to a distance between a sensor and the object, and due to attributes of the object, for example, a reflectance of the object, a size of the object, and the like.

The hole determiner 120 may determine whether a hole is present in the depth image, using the color image including more information than the depth image. For example, the hole determiner 120 may perform image processing with respect to the color image to extract a foreground, and compare the foreground extracted from the color image to the foreground extracted by the foreground extractor 110. When pixels excluded from the foreground extracted by the foreground extractor 110 are present although the pixels are included in the foreground extracted from the color image, the hole determiner 120 may determine that a hole is present in the depth image.

Although not shown in FIG. 1, the hole determiner 120 may include a hole extractor to extract a hole when it is determined that the hole is present in the depth image. In this instance, the hole extractor may detect missing data in the depth image, using the color image. The hole extractor may extract a hole in the depth image, using the detected missing data in the depth image.

Figure 2:
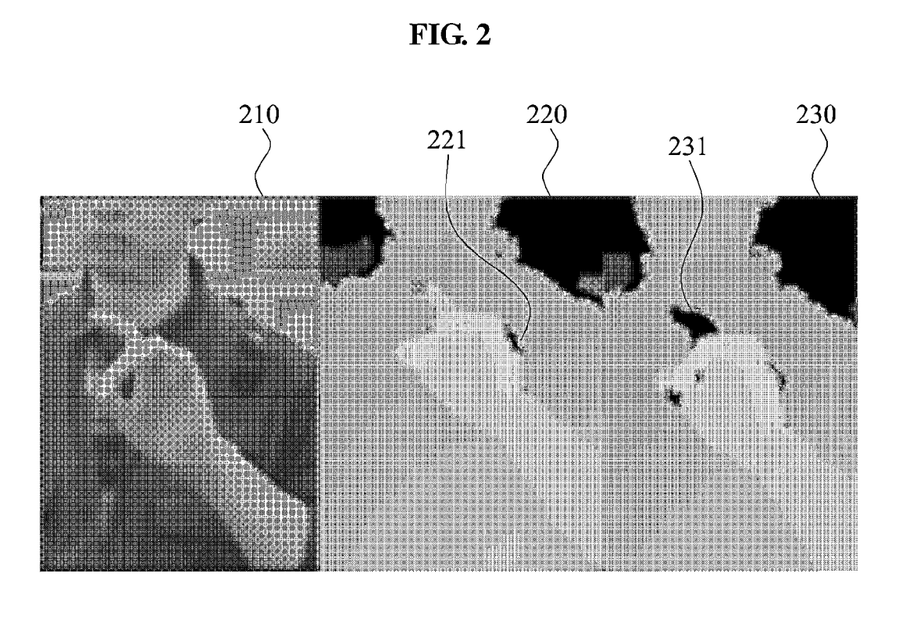
FIG. 2 illustrates holes in a depth image according to example embodiments.

For example, the apparatus 100 may recognize a posture of a hand of a user. In this instance, the hand of the user may correspond to an object recognized by the apparatus 100. Referring to FIG. 2, the apparatus 100 may acquire a color image 210, and depth images 220 and 230.

Here, the depth image 220 may be unable to contain a proper depth value of a portion of a little finger of the user. In this instance, the depth image 220 may include a hole 221.

Depending on cases, a hole included in a depth image may affect a result of posture recognition. For example, the depth image 230 may be unable to contain a proper depth value of the entirety of a forefinger. In this instance, the depth image 230 may include a hole 231. The posture of the hand of the user may not be recognized properly due to the hole 231.

However, the color image 210 may include more information than the depth images 220 and 230. For example, a resolution of the color image 210 may be higher than resolutions of the depth images 220 and 230. Accordingly, the color image 210 may not include missing data, for example, the holes 221 and 231 in the depth images 220 and 230.

Accordingly, the apparatus 100 may extract a hole in a depth image using a color image, thereby providing technology for increasing an accuracy of recognizing an object or a posture of the object. An operation of extracting a hole in a depth image using a color image will be described in detail with reference to FIG. 3.

Referring back to FIG. 1, the feature vector generator 130 may generate a feature vector for recognizing the object, based on the foreground extracted by the foreground extractor 110 and the hole extracted by the hole extractor.

Here, the feature vector may include a plurality of features corresponding to the object, and the plurality of features may include values to be used for expressing the object, respectively. For example, a feature may include depth information of a point of the object corresponding to the feature.

For example, the feature generator 130 may assign depth values to features corresponding to the foreground. According to other example embodiments, the feature vector generator 130 may detect a minimum value of the depth values of the features corresponding to the foreground, and assign the detected minimum value to the features corresponding to the foreground.

According to still other example embodiments, the feature vector generator 130 may assign a value of a feature corresponding to the foreground, in light of adjacent features of the corresponding feature. In particular, the feature vector generator 130 may detect the adjacent features included in an adjacent area of the corresponding feature, among the features corresponding to the foreground. In this instance, the feature vector generator 130 may assign an average value of depth values of the adjacent features to the corresponding feature.

In addition, the object recognizer 140 may compare the feature vector generated by the feature vector generator 130 to at least one reference feature vector.

Here, the at least one reference feature vector may correspond to at least one predetermined shape of the object, and may be provided in an object recognition database (not shown), in advance. The apparatus 100 may be implemented to include the object recognition database, and depending on a case, the apparatus 100 may also be implemented to obtain necessary information from the object recognition database provided separately from the apparatus 100.

The object recognizer 140 may compare the feature vector to the at least one reference feature vector, using various schemes. As an example, the object recognizer 140 may calculate distances between features included in the feature vector and features included in the at least one reference feature vector, in order to compare the feature vector to the at least one reference feature vector. As another example, the object recognizer 140 may calculate a distance between the feature vector and the at least one reference feature vector, in lieu of comparing a plurality of features included in the feature vector to a plurality of features included in the at least one reference feature vector. Hereinafter, the foregoing operation will be further described in detail.

In addition, the object recognizer 140 may recognize the object based on a result of the comparing. Hereinafter, the recognition of the object by the object recognizer 140 may include recognizing a figure, shape, or form of the object, for example, a posture of a hand of a user, and the like.

For example, the object recognizer 140 may detect a reference feature vector most similar to the feature vector generated by the feature vector generator 130, and output an object corresponding to the detected reference feature vector.

Accordingly, the apparatus 100 may utilize a depth image and a color image in an object classifier, directly, in lieu of restoring the depth image or the color image.

Figure 3:
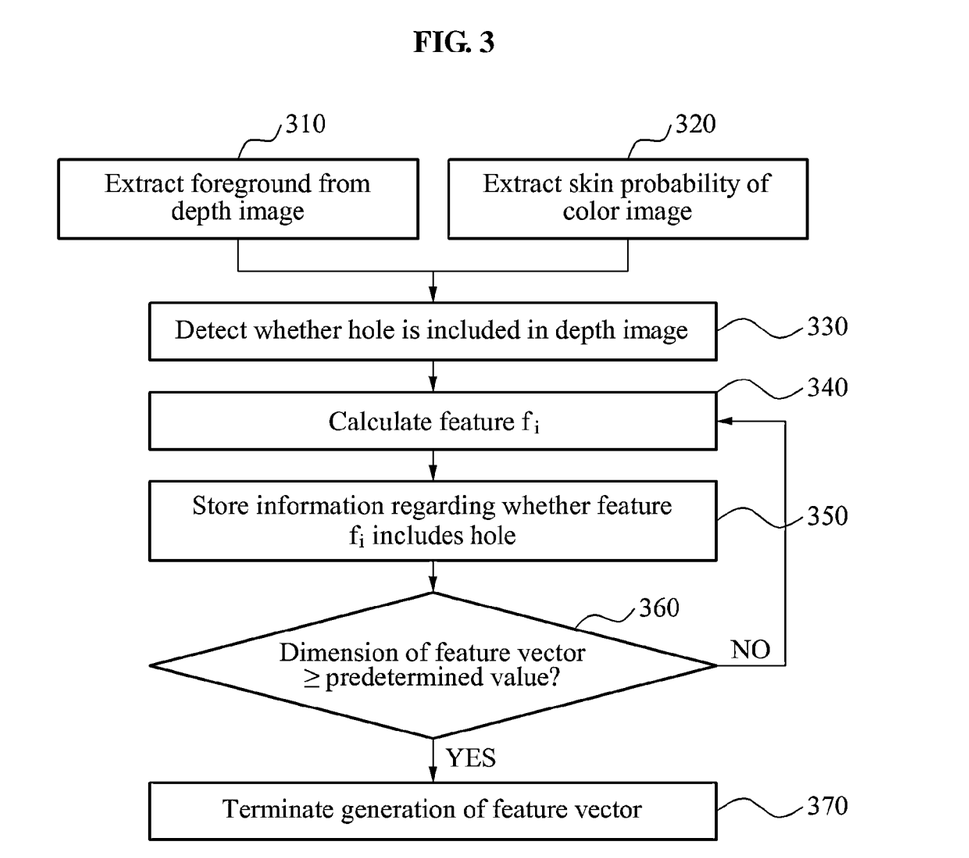
FIG. 3 illustrates operations of a hole extractor and a feature vector generator included in an apparatus for recognizing an object according to example embodiments.

FIG. 3 illustrates operations of a hole extractor and a feature vector generator included in an apparatus for recognizing an object according to example embodiments.

Referring to FIG. 3, in operation 320, the hole extractor may calculate a probability that pixels are included in an object, based on color information of the corresponding pixels included in a color image.

For example, when the object corresponds to a hand of a user, the hole extractor may calculate a skin probability of the pixels, based on the color information of the corresponding pixels included in the color image. Here, the skin probability may include a probability that the pixels correspond to a skin of the user.

As described above, a foreground extractor may extract a foreground from a depth image, in operation 310. In operation 330, the hole extractor may detect whether a hole is included in the depth image. When a hole is included in the depth image, the hole extractor may determine that an area excluded from the foreground of the depth image corresponds to the hole in the depth image when a probability that the area is included in the object, for example, a skin probability, is greater than or equal to a predetermined threshold probability.

In operation 340, the feature vector generator may calculate a feature $f_i$. In operation 350, the feature vector generator may store information regarding whether the calculated feature $f_i$ includes a hole. For example, the feature vector generator may generate a feature vector for recognizing the object, using the extracted hole in the depth image. In this instance, the feature vector generator may incorporate information regarding whether a feature corresponds to a hole into a plurality of features included in the feature vector.

In particular, the feature vector generator may incorporate values, for example, depth values, to be used for expressing the object in a plurality of features corresponding to the object. Further, the feature vector generator may additionally incorporate the information regarding whether a feature corresponds to a hole into the plurality of features corresponding to the object.

In operation 360, the feature vector generator may determine whether a dimension of the feature vector is greater than or equal to a predetermined value. When the dimension of the feature vector is less than the predetermined value, operations 340 and 350 may be performed iteratively. Here, the dimension of the feature vector may include a number of features included in the feature vector.

In operation 370, the feature vector generator may terminate the generation of the feature vector when the dimension of the feature vector is greater than or equal to the predetermined value.

Figure 4:
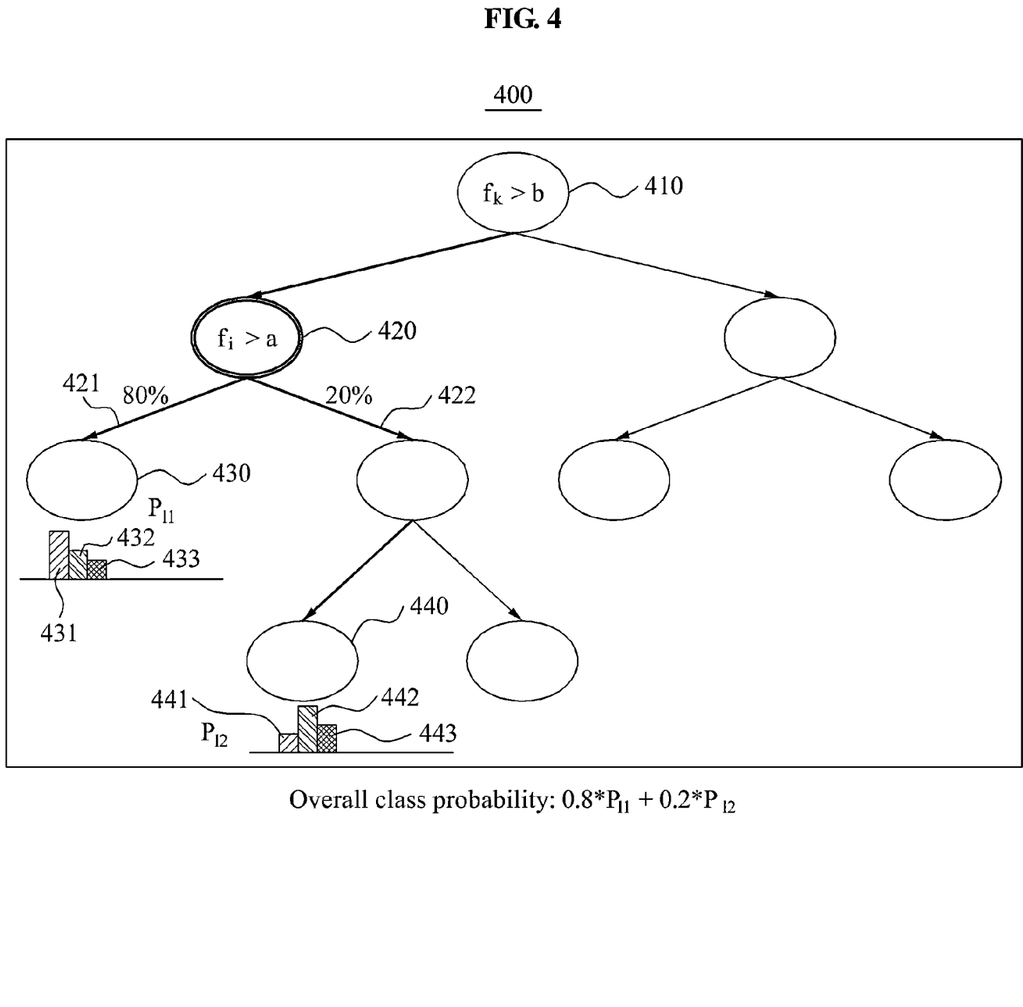
FIGS. 4 and 5 illustrate an operation of an object recognizer according to example embodiments.
Figure 5:
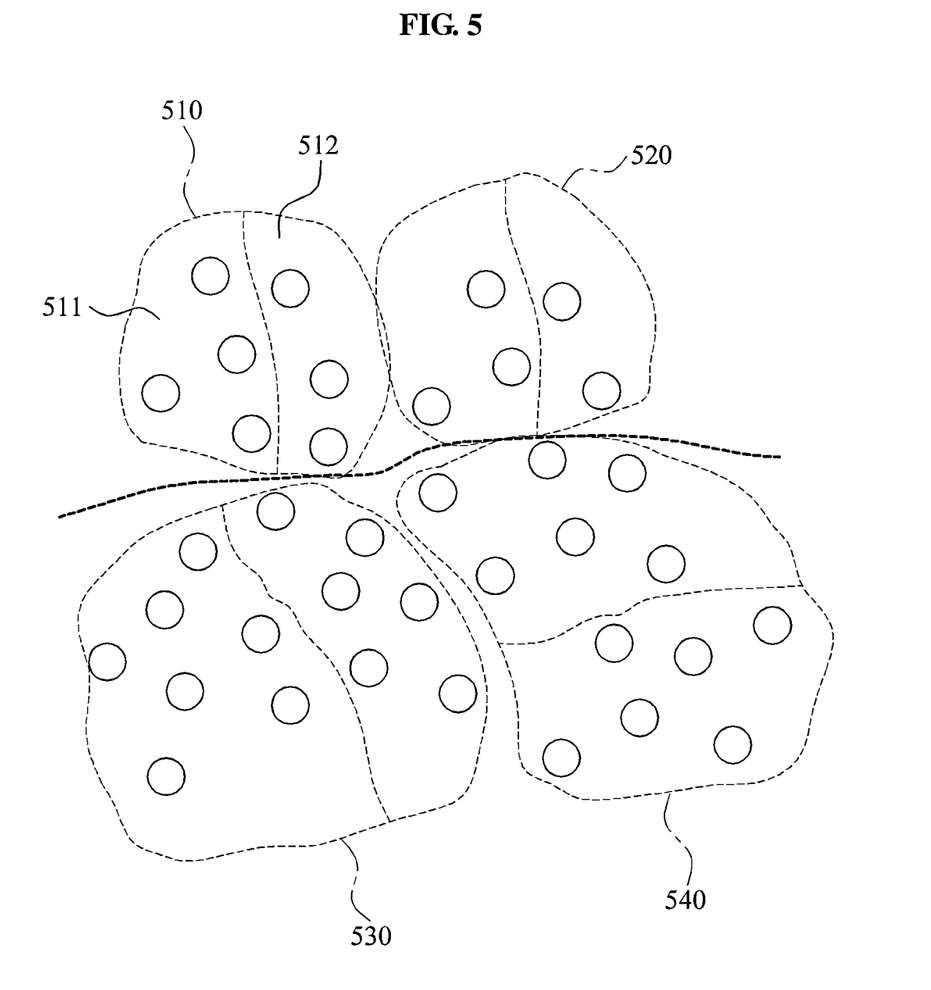

FIGS. 4 and 5 illustrate an operation of an object recognizer according to example embodiments.

The object recognizer may recognize an object using various schemes, based on information regarding whether a feature corresponds to a hole.

Referring to FIG. 4, the object recognizer may use a decision tree 400 for comparing a feature vector to a reference feature vector.

In particular, the object recognizer may include a decision tree obtainer, and an object estimator. The decision tree obtainer may obtain the decision tree 400. Here, the decision tree 400 may include branch nodes 410 and 420, and leaf nodes 430 and 440. Here, the branch nodes 410 and 420 may correspond to a plurality of features included in the feature vector, and the leaf nodes 430 and 440 may include information 431, 432, 433, 441, 442, and 443 associated with a shape of the object.

Concisely, the object estimator may ramify at a predetermined branch node for traversal to a leaf node. The object estimator may select a branch to ramify, based on whether a value of a feature corresponding to the predetermined branch node is greater than a value of a reference feature. For example, when a value $f_k$ of a $k^{th}$ feature is greater than a value b of a reference feature at the branch node 410, the object estimator may ramify in a direction of a left branch.

In addition, the object estimator may recognize a branch node corresponding to a feature being a hole, based on information regarding whether a feature corresponds to a hole. For example, treating a feature corresponding to the branch node 420 as a hole, the object estimator may traverse a plurality of branches 421 and 422 based on the branch node 420. Further, the object estimator may estimate the object, based on information included in the plurality of leaf nodes 430 and 440 to be reached as a result of traversing the plurality of branches 421 and 422.

For example, using the parlance of the rock, paper, scissors game, the leaf node 430 may include a probability 431 that a recognized posture of the hand of the user corresponds to scissors, a probability 432 that the recognized posture corresponds to rock, and a probability 433 that the recognized posture corresponds to paper. The leaf node 440 may include a probability 441 that the recognized posture of the hand of the user corresponds to scissors, a probability 442 that the recognized posture corresponds to rock, and a probability 443 that the recognized posture corresponds to paper.

In this instance, according to the information included in the leaf node 430, the probability 431 that the recognized posture corresponds to scissors is the highest, and the probability 433 that the recognized posture corresponds to paper is the lowest. However, according to the information included in the leaf node 440, the probability 442 that the recognized posture corresponds to rock is the highest, and the probability 441 that the recognized posture corresponds to scissors is the lowest.

The object estimator may estimate the object, using all of the information included in the plurality of leaf nodes 430 and 440. In particular, the object estimator may estimate the object, based on a result derived in equal consideration of the information included in the leaf node 430 and the information included in the leaf node 440.

According to other example embodiments, the object estimator may utilize a probability extracted from a color image as a weight of a leaf node. As described above, the hole extractor may calculate the probability that the pixels are included in the object, based on the color information of the corresponding pixels included in the color image. In this instance, the object estimator may obtain weights of a plurality of leaf nodes based on the probability calculated by the hole extractor.

For example, treating a feature corresponding to the leaf node 420 as a hole, and setting a probability that the feature corresponds to an object to 80%, the object estimator may set a weight of the leaf node 430 to 0.8, and a weight of the leaf node 440 to 0.2. Further, the object estimator may output a sum of a value obtained by multiplying the information included in the leaf node 420 by 0.8 and a value obtained by multiplying the information included in the leaf node 430 by 0.2.

Accordingly, an apparatus for recognizing an object according to the present embodiments may traverse both branches 421 and 422 when missing data is present at the branch node 420, and properly add the probabilities stored in the leaf nodes 430 and 440, thereby perform tree classification with respect to the missing data.

Referring to FIG. 5, the object recognizer may use a codeword generated by a hierarchical clustering scheme.

According to the hierarchical clustering scheme, features expressed by an identical representative value may be classified as a single cluster. For example, a plurality of features included in a cluster 511 may be expressed by a first representative value, and a plurality of features included in a cluster 512 may be expressed by a second representative value.

Further, the cluster 511 and the cluster 512 may share a fourth representative value differing from a third representative value of a cluster 520. In this instance, the cluster 511 and the cluster 512 may be classified as an upper cluster 510. In addition, the cluster 510 and the cluster 520 may share a sixth representative value differing from a fifth representative value shared by a cluster 530 and a cluster 540.

According to example embodiments, at least one reference feature vector may include a plurality of codewords generated by the hierarchical clustering scheme.

In this instance, the object recognizer may detect a codeword most similar to the feature vector, among the plurality of codewords, by comparing the feature vector for recognizing the object to the plurality of codewords.

The object recognizer may recognize the object, using the detected codeword. For example, the object recognizer may recognize a shape corresponding to the detected codeword as a shape of the object, and output the corresponding shape.

Although not shown in the drawings, when a hole determiner determines that a hole is absent in the depth image, the object recognizer may compare a plurality of features included in the feature vector to reference features included in the at least one reference feature vector.

For example, the object recognizer may calculate a distance between a feature vector and a reference feature vector, using Equation 1.

$$D = \frac{\sum_{i \in \{1,2,\ldots,N\}} (f_i - f_i')^n}{N} \quad \text{[Equation 1]}$$

In Equation 1, N denotes a dimension of a feature vector, $f_i$ denotes a feature included in a feature vector $F=[f_1, f_2, f_3, \ldots, f_N]$, and $f_i'$ denotes a reference feature included in a reference feature vector $F'=[f_1', f_2', f_3', \ldots, f_N']$.

Parameter n denotes a parameter for determining a dimension of the calculated distance. For example, when n=1, the dimension of the distance D calculated by the object recognizer may correspond to a difference in an absolute value of a feature value. When n=2, the dimension of the distance D may correspond to a difference in a Euclidean distance of a feature value.

According to other example embodiments, the object recognizer may additionally use information regarding whether a feature included in the plurality of features corresponds to a hole.

In particular, the object recognizer may generate a foreground feature vector including remaining features, excluding a feature corresponding to a hole from a plurality of feature vectors included in a feature vector, based on the information regarding whether a feature corresponds to a hole. In this instance, the object recognizer may detect a codeword most similar to the foreground feature vector, among the plurality of codewords, by comparing the foreground feature vector to the plurality of codewords.

Accordingly, the apparatus for recognizing an object may estimate a most similar codeword by calculating a distance between a codeword generated by the hierarchical clustering scheme and an input feature vector, thereby increasing an accuracy of object recognition, when compared to a scheme of comparing features including a feature corresponding to a hole, respectively.

The apparatus for recognizing an object may utilize a parallel processing scheme to compare a feature vector to a codeword. For example, the apparatus for recognizing an object may compare the feature vector to the codeword, using a graphic processing unit (GPU) capable of performing parallel processing.

Although not shown in the drawings, the object recognizer may compare, based on the information regarding whether a feature included in the plurality of features corresponds to a hole, remaining features, excluding a feature corresponding to a hole from a plurality of features included in the feature vector, to reference features included in the at least one reference feature vector.

For example, the object recognizer may calculate a distance between a feature vector and a reference feature vector, using Equation 2.

$$D = \frac{\sum_{i \in \{1,2,\ldots,N\} \setminus \{t_1,\ldots,t_k\}} (f_i - f_i')^n}{N - k} \quad \text{[Equation 2]}$$

In Equation 2, N denotes a dimension of a feature vector, $f_i$ denotes a feature included in a feature vector $F=[f_1, f_2, f_3, \ldots, f_N]$, and $f_i'$ denotes a reference feature included in a reference feature vector $F'=[f_1', f_2', f_3', \ldots, f_N']$. In this instance, the feature vector F may include a k number of holes, and $(t_1, \ldots, t_k)$ denotes positions of the holes.

n denotes a parameter for determining a dimension of the calculated distance. For example, when n=1, the dimension of the distance D calculated by the object recognizer may correspond to a difference in an absolute value of a feature value. When n=2, the dimension of the distance D may correspond to a difference in a Euclidean distance of a feature value.

Although not shown in the drawings, according to still other example embodiments, the object recognizer may determine a value of a feature corresponding to a hole, based on statistical values associated with features corresponding to a foreground extracted by the foreground extractor.

Here, the statistical values may include at least one of a minimum value, a maximum value, an intermediate value, an average, and a standard deviation of depth values of the features corresponding to the foreground.

For example, the object recognizer may readjust the value of the feature corresponding to a hole, using Equation 3.

$$\text{Depth}_{Hole} = \text{Min}(\text{Depth}_{Foreground}) \quad \text{[Equation 3]}$$

Figure 6:
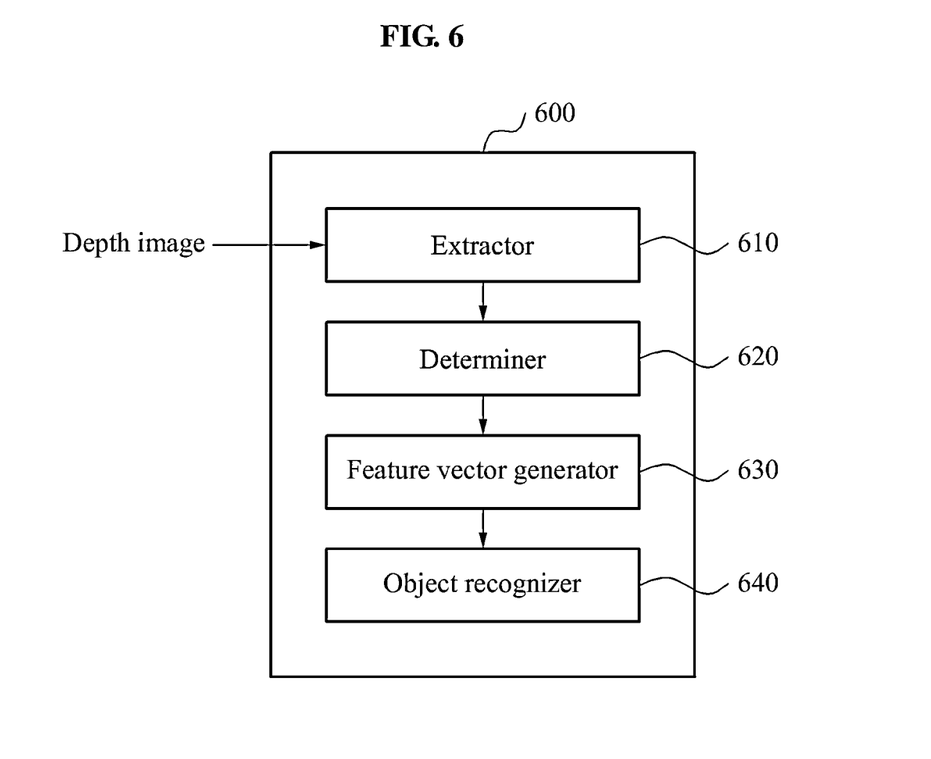
FIG. 6 illustrates an apparatus for recognizing an object using statistical values associated with depth values of a foreground included in a depth image according to example embodiments.

FIG. 6 illustrates an apparatus 600 for recognizing an object using statistical values associated with depth values of a foreground included in a depth image according to example embodiments.

Referring to FIG. 6, the apparatus 600 may include an extractor 610, a determiner 620, a feature vector generator 630, and an object recognizer 640.

The extractor 610 may extract a foreground and a background from a depth image including a depth associated with an object. The description provided with reference to FIGS. 1 through 5 may be applied identically to the extractor 610 and thus, a repeated description will be omitted herein for conciseness.

The determiner 620 may determine a depth value of the background, based on statistical values associated with depth values of pixels corresponding to the foreground.

Here, the statistical values may include at least one of a minimum value, a maximum value, an intermediate value, an average, and a standard deviation of the depth values of the pixels corresponding to the foreground.

For example, the determiner 620 may readjust the depth value of the background for the background to be spaced a predetermined distance from the foreground. The determiner 620 may determine the depth value of the background, by calculating a sum of the minimum value and the standard deviation of the depth values of the pixels corresponding to the foreground.

$$\text{Depth}_{Background} = \text{Min}(\text{Depth}_{Foreground}) + \alpha \quad \text{[Equation 4]}$$

According to Equation 4, the determiner 620 may readjust the depth value of the background, by adding α to the minimum value of the depth values of the foreground in the depth image. Here, α may correspond to the standard deviation of the depth values of the foreground, and in addition, various values may be substituted for α.

Accordingly, the apparatus 600 may readjust a depth value of a background based on depth values of a foreground, thereby providing technology for reducing an error in a feature caused by a hole included in a depth image.

In addition, the feature vector generator 630 may generate a feature vector, by generating a plurality of features corresponding to the object, based on the depth value of the background and the depth values of the pixels corresponding to the foreground. For example, the feature vector generator 630 may generate a difference between depth values of the background and the foreground as an element of the feature vector.

The object recognizer 640 may recognize the object, based on the generated feature vector and at least one reference feature vector corresponding to a predetermined shape of the object.

Here, the description provided with reference to FIGS. 1 through 5 may be applied identically to the feature vector generator 630 and the object recognizer 640.

For example, the object recognizer 640 may detect a codeword most similar to the feature vector, among the plurality of codewords, by comparing the feature vector in which the depth value of the background is readjusted to a plurality of codewords generated by a hierarchical clustering scheme. In this instance, the object recognizer 640 may estimate the object using the detected codeword.

Figure 7:
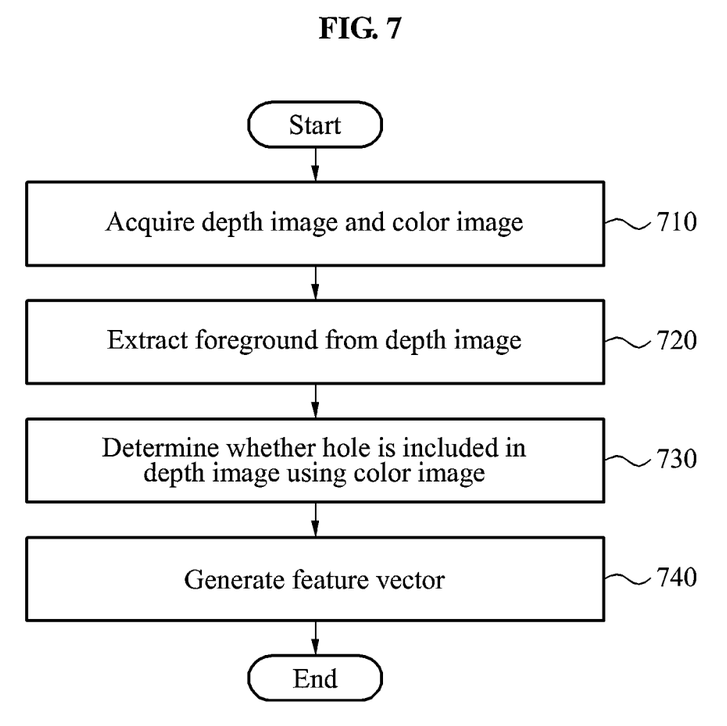
FIG. 7 illustrates a method of recognizing an object using a depth image and a color image according to example embodiments.

FIG. 7 illustrates a method of recognizing an object using a depth image and a color image according to example embodiments.

Referring to FIG. 7, in operation 710, a depth image including a depth associated with the object, and a color image including a color associated with the object may be acquired.

In operation 720, a foreground may be extracted from the acquired depth image. In operation 730, whether a hole is included in the depth image may be determined using the acquired color image.

In operation 740, a feature vector for recognizing the object may be generated by generating a plurality of feature vectors corresponding to the object based on the hole and the extracted foreground.

Figure 8:
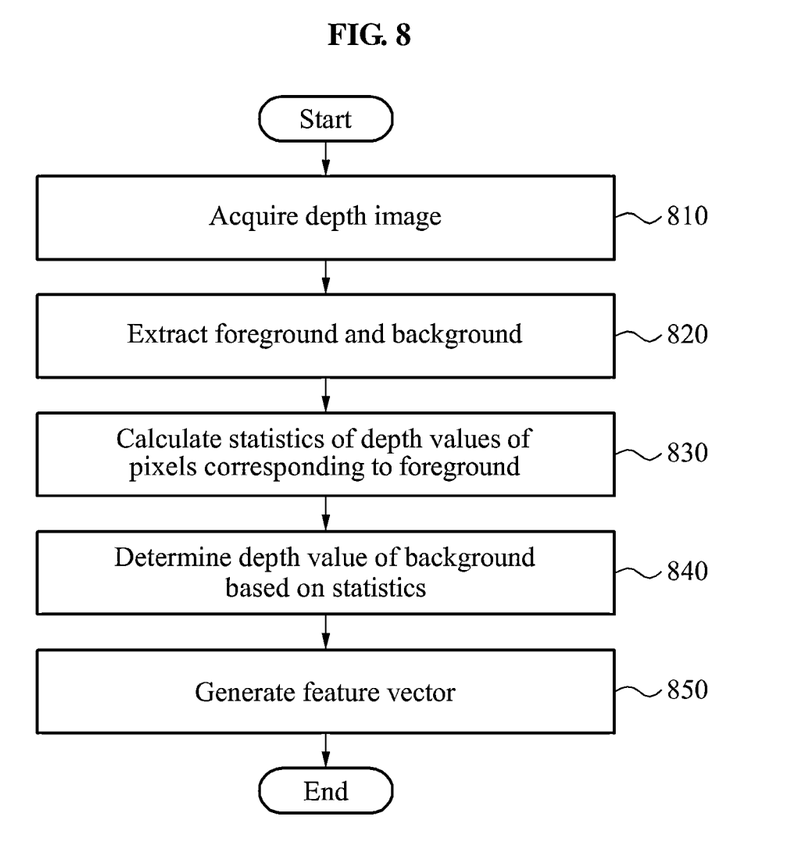
FIG. 8 illustrates a method of recognizing an object using statistical values associated with depth values of a foreground included in a depth image according to example embodiments.

FIG. 8 illustrates a method of recognizing an object using statistical values associated with depth values of a foreground included in a depth image according to example embodiments.

Referring to FIG. 8, in operation 810, a depth image including a depth associated with the object may be acquired. In operation 820, a foreground and a background may be extracted from the acquired depth image.

In operation 830, statistical values associated with depth values of pixels corresponding to the extracted foreground may be calculated. In operation 840, a depth value of the extracted background may be determined based on the calculated statistical values.

In addition, in operation 850, a feature vector for recognizing the object may be generated by generating a plurality of feature vectors corresponding to the object based on the depth value of the background and the depth values of the pixels corresponding to the foreground.

The description provided with reference to FIGS. 1 through 6 may be applied identically to the operations of FIGS. 7 and 8 and thus, a repeated description will be omitted for conciseness.

Figure 9:
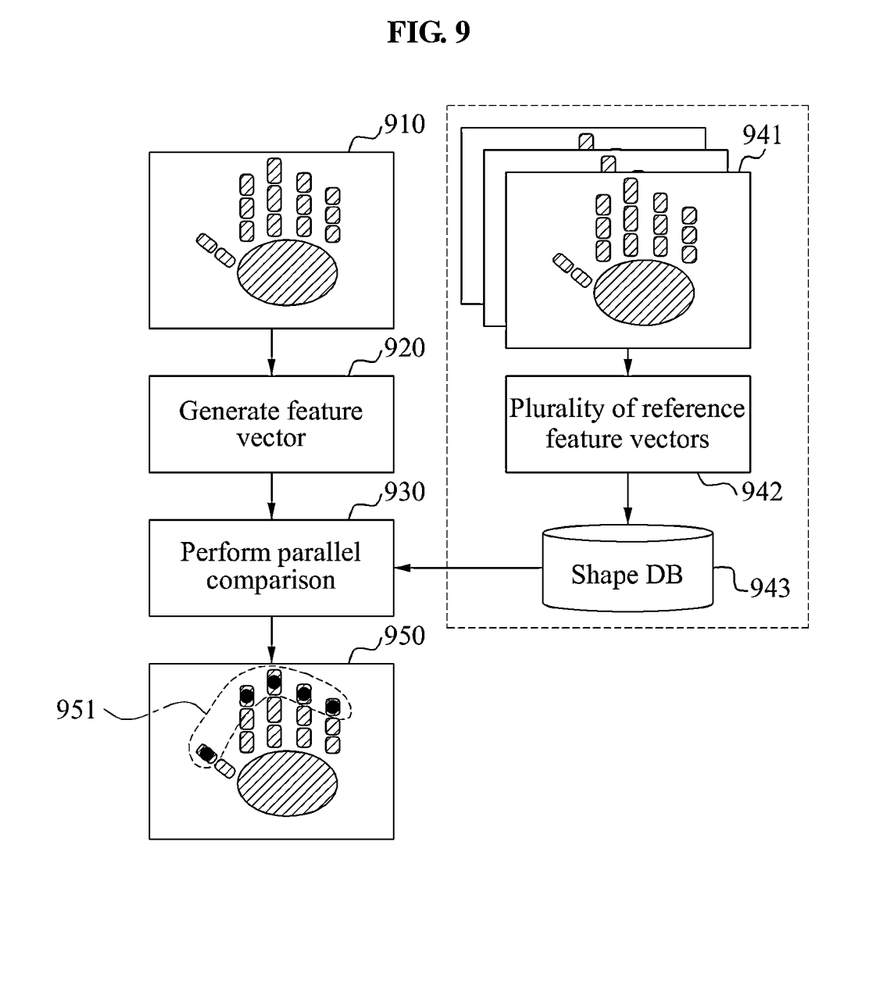
FIGS. 9 and 10 illustrate an operation of an apparatus for recognizing an object using a plurality of codewords provided in advance according to example embodiments.
Figure 10:
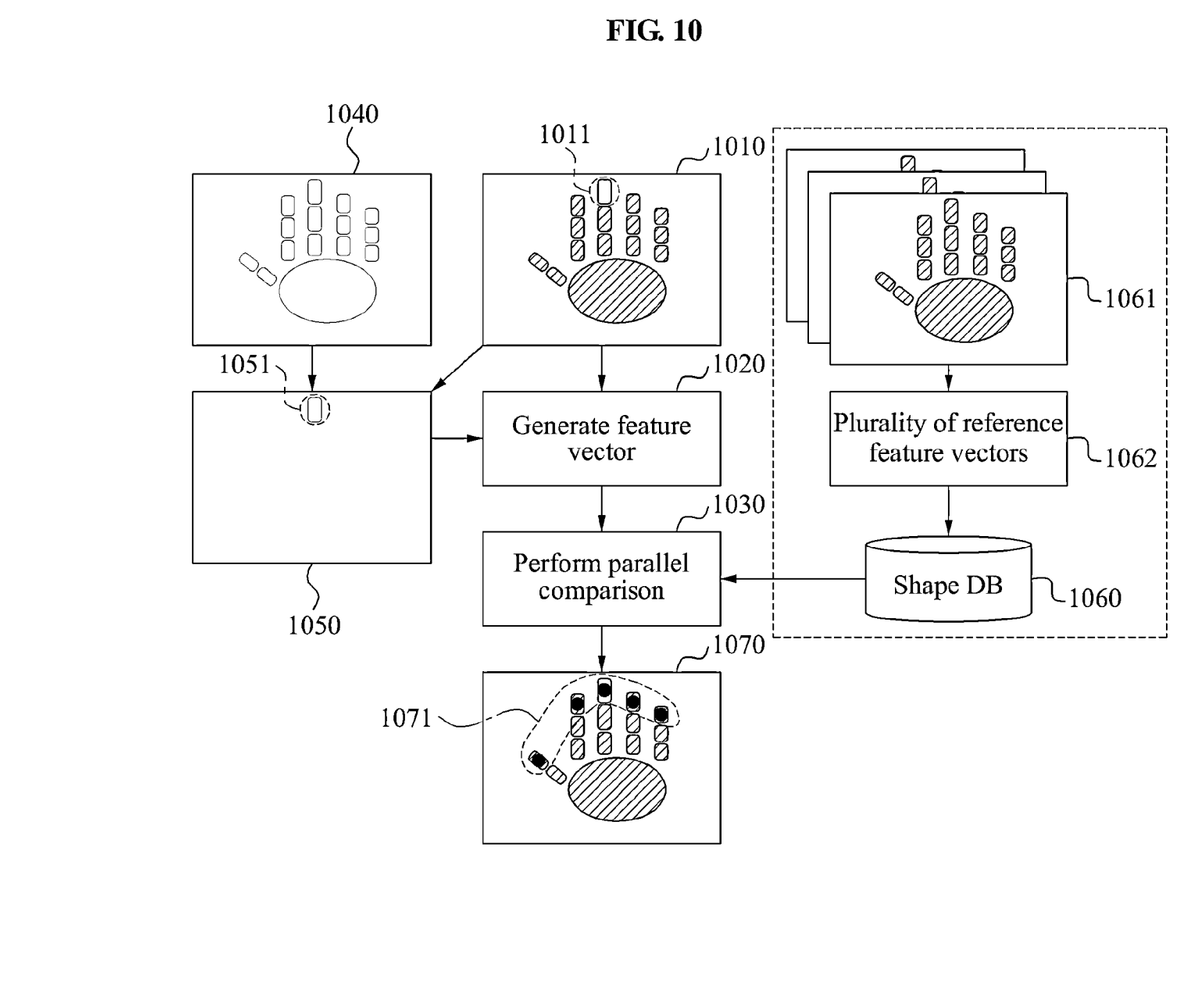

FIGS. 9 and 10 illustrate an operation of an apparatus for recognizing an object using a plurality of codewords provided in advance according to example embodiments.

Referring to FIG. 9, in operation 910, the apparatus for recognizing an object may acquire a depth image without a hole. In this instance, in operation 920, the apparatus for recognizing an object may generate a feature vector including a plurality of features from the depth image.

In operation 930, the apparatus for recognizing an object may perform a parallel comparison using a shape database 943 provided in advance for recognizing the object. In this instance, the shape database 943 may store a plurality of reference feature vectors 942 generated based on a plurality of depth images 941 associated with a predetermined object or a predetermined posture of the predetermined object.

In addition, in operation 950, the apparatus for recognizing an object may derive positions 951 of tips of the object, by performing a parallel comparison operation with the plurality of reference feature vectors 942 included in the shape database 943. The apparatus for recognizing an object may recognize the object or a posture of the object, based on the derived positions 951 of the tips of the object.

Referring to FIG. 10, in operation 1010, the apparatus may acquire a depth image including a hole 1011.

In this instance, the apparatus may extract the hole 1011 included in the depth image using a color image. For example, in operation 1040, the apparatus may acquire a color image. In operation 1050, the apparatus may extract a hole 1051 included in the depth image, based on a difference between the color image and the depth image.

In operation 1020, the apparatus may generate a feature vector including a plurality of features based on the extracted hole 1051 and the depth image.

In operation 1030, the apparatus may perform a parallel comparison using a shape database 1060 provided in advance for recognizing the object. For example, the apparatus may compare the feature vector generated in operation 1020 to a plurality of reference feature vectors 1062 included in the shape database 1060, in parallel. The reference feature vectors may be generated based on a plurality of depth images 1061 associated with a predetermined object or a predetermined posture of the predetermined object.

As a result, in operation 1070, the apparatus may derive positions 1071 of tips of the object. The apparatus may recognize the object or a posture of the object, based on the derived positions 1071 of the tips of the object.

Processes, functions, methods, and/or software in embodiments described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for recognizing an object, the apparatus comprising:
   a processor configured to
      extract a foreground from a depth image comprising a depth associated with the object;
      determine whether a hole is present in the depth image, based on the foreground and a color image comprising a color associated with the object;
      generate, using the foreground and the hole, a feature vector comprising a plurality of features corresponding to the object, based on a result of the determining; and recognize the object by calculating a distance between the generated feature vector and a reference feature vector corresponding to a predetermined shape of the object.

2. The apparatus of claim 1, wherein the processor is further configured to extract the hole based on the foreground and the color image when it is determined that the hole is present in the depth image.

3. The apparatus of claim 2, wherein the processor is further configured to calculate a probability that pixels included in the color image are included in the object, based on color information of the pixels, and to extract the hole based on the probability.

4. The apparatus of claim 3, wherein the processor is further configured to determine that an area excluded from the foreground of the depth image corresponds to the hole when a probability that the area is included in the object is greater than or equal to a predetermined threshold probability.

5. The apparatus of claim 3, wherein the object comprises a hand of a user, and the probability comprises a skin probability.

6. The apparatus of claim 2, wherein the plurality of features comprises information regarding whether a feature corresponds to a hole.

7. The apparatus of claim 6, wherein the processor is further configured to compare, based on the information regarding whether a feature corresponds to a hole, remaining features, excluding a feature corresponding to a hole from a plurality of features included in the feature vector, to reference features included in the at least one reference feature vector.

8. The apparatus of claim 6, wherein the at least one reference feature vector comprises a plurality of codewords generated by a hierarchical clustering scheme, and
wherein the processor is further configured to
generate a foreground feature vector comprising the remaining features based on the information regarding whether a feature corresponds to a hole,
detect a codeword most similar to the foreground feature vector, among the plurality of codewords, by comparing the plurality of codewords to the foreground feature vector, and
recognize the object using the detected codeword.

9. The apparatus of claim 6, wherein the processor is further configured to:
obtain a decision tree for comparing the feature vector to the at least one reference feature vector;
recognize a branch node corresponding to a feature corresponding to a hole, among the plurality of features, based on the information regarding whether a feature corresponds to a hole;
traverse a plurality of branches based on the branch node; and
estimate the object based on information included in a plurality of leaf nodes to be reached based on a result of the traversing,
wherein the decision tree comprises a plurality of branch nodes corresponding to a plurality of features included in the feature vector, and at least one leaf node comprising information related to a shape of the object.

10. The apparatus of claim 9, wherein the processor is further configured to
calculate a probability that pixels included in the color image are included in the object, based on color information of the pixels,
obtain weights of the plurality of leaf nodes based on the calculated probability, and
estimate the object based on the information included in the plurality of leaf nodes and the weights of the plurality of leaf nodes.

11. The apparatus of claim 1, wherein the processor is further configured to determine a value of a feature corresponding to the hole, based on statistical values associated with features corresponding to the foreground, when a hole is present in the depth image.

12. The apparatus of claim 11, wherein the statistical values comprise at least one of a minimum value, a maximum value, an intermediate value, an average, and a standard deviation of depth values of the plurality of features corresponding to the foreground.

13. The apparatus of claim 1, wherein the at least one reference feature vector comprises a plurality of codewords generated by a hierarchical clustering scheme, and
wherein the processor is further configured to detect a codeword most similar to the feature vector, among the plurality of codewords, by comparing the plurality of codewords to the feature vector, and to recognize the object using the detected codeword.

14. The apparatus of claim 1, wherein the depth image and the color image of the object are captured simultaneously.

15. The apparatus of claim 1, wherein
the at least one reference feature vector comprises a plurality of codewords,
the plurality of codewords is stored in a database provided in advance, and
the processor is further configured to detect a codeword most similar to the feature vector, among the plurality of codewords, by comparing the plurality of codewords to the feature vector using the database, and to recognize the object using the detected codeword.

16. The apparatus of claim 1, wherein the processor is further configured to determine that a first area, from among a second area excluded from the foreground of the depth image, corresponds to the hole when a probability that the first area is included in the object is greater than or equal to a predetermined threshold probability.

17. An apparatus for recognizing an object, the apparatus comprising:
a processor configured to
extract a foreground and a background from a depth image comprising a depth associated with the object;
determine a depth value of the background, based on statistical values associated with depth values of pixels corresponding to the foreground;
generate a feature vector, by generating a plurality of features corresponding to the object based on the depth value of the background and the depth values of the pixels corresponding to the foreground; and
recognize the object, based on the feature vector and at least one reference feature vector corresponding to a predetermined shape of the object.

18. The apparatus of claim 17, wherein the statistical values comprise at least one of a minimum value, a maximum value, an intermediate value, an average, and a standard deviation of the depth values of the pixels corresponding to the foreground.

19. The apparatus of claim 17, wherein the processor is further configured to determine the depth value of the background, by calculating a sum of a minimum value and a standard deviation of the depth values of the pixels corresponding to the foreground.

20. The apparatus of claim 17, wherein the at least one reference feature vector comprises a plurality of codewords generated by a hierarchical clustering scheme, and
 wherein the processor is further configured to detect a codeword most similar to the feature vector, among the plurality of codewords, by comparing the plurality of codewords to the feature vector, and to recognize the object using the detected codeword.

21. A method of recognizing an object, the method comprising:
 acquiring a depth image comprising a depth associated with the object, and a color image comprising a color associated with the object;
 extracting a foreground from the depth image;
 determining whether a hole is present in the depth image, using the foreground and the color image;
 generating, using at least one processor, a feature vector comprising a plurality of features corresponding to the object using the foreground and the hole, based on a result of the determination; and
 recognizing the object by calculating a distance between the generated feature vector and a reference feature vector corresponding to a predetermined shape of the object.

* * * * *